Nov. 7, 1950     E. W. LANDON     2,529,028
CHEMICAL FEEDER

Filed July 31, 1947     3 Sheets-Sheet 3

Inventor
Everett W. Landon

By Clarence A. O'Brien
and Harvey B. Jacobson
Attorneys

Patented Nov. 7, 1950

2,529,028

UNITED STATES PATENT OFFICE 2,529,028

CHEMICAL FEEDER

Everett W. Landon, San Mateo, Calif., assignor to Landon Standard Pools, Belmont, Calif., a corporation of California Application July 31, 1947, Serial No. 765,174

2 Claims. (Cl. 210—40)

1

This invention relates to a chemical feeder, or device for feeding intermittently, a supply or quantity of chemical liquid to water, for the treatment thereof, for swimming pools, tanks or drinking water or other water supply.

The object of this invention is to provide a chemical feeder which is automatic in its operation, but which when not under water pressure, closes off the supply of chemical to the water, especially in a pipe under pressure including suction pressure, but which when subjected to pressure of water in the line, will cause the escape or discharge of the chemical for supplying the same to the water in the supply or feed line to the swimming pool, tank, for drinking purposes or otherwise.

Another object of the invention, is to provide a novel and simple chemical feeder, including a novel circuit arrangement, and in which the parts of the feeder are resistant to the action of the chemical such as chlorine or other chemical or liquid which is supplied to the water for the purpose of chlorinating or treating the same to kill the growth of algae, bacteria, fungi, etc. in the treated water.

A still further object of the invention, is to provide a chemical feeder by which the supply of the chemical is automatically cut off when the pressure in the line is reduced or cut off.

Other objects and advantages reside in the details of construction and operation as more fully hereinafter described and claimed, reference being had to the accompanying drawings forming part hereof, wherein like numerals refer to like parts throughout, and in which—

Figure 1:
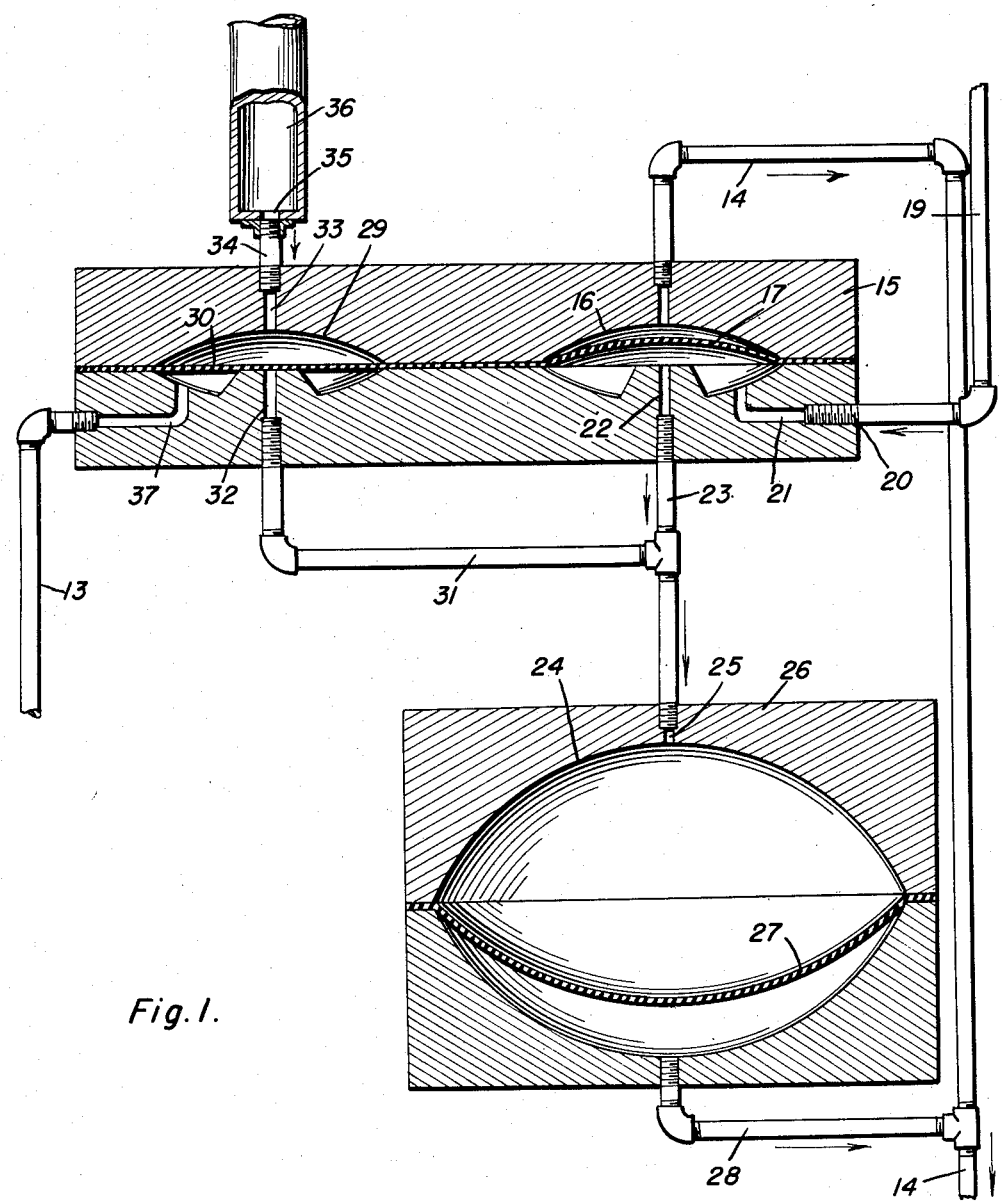
Figure 1 is a sectional elevation showing a chemical feeder constructed in accordance with the invention, the supply of chemical to be fed to the water being cut off by lack of pressure in the supply line for the water.
Figure 2:
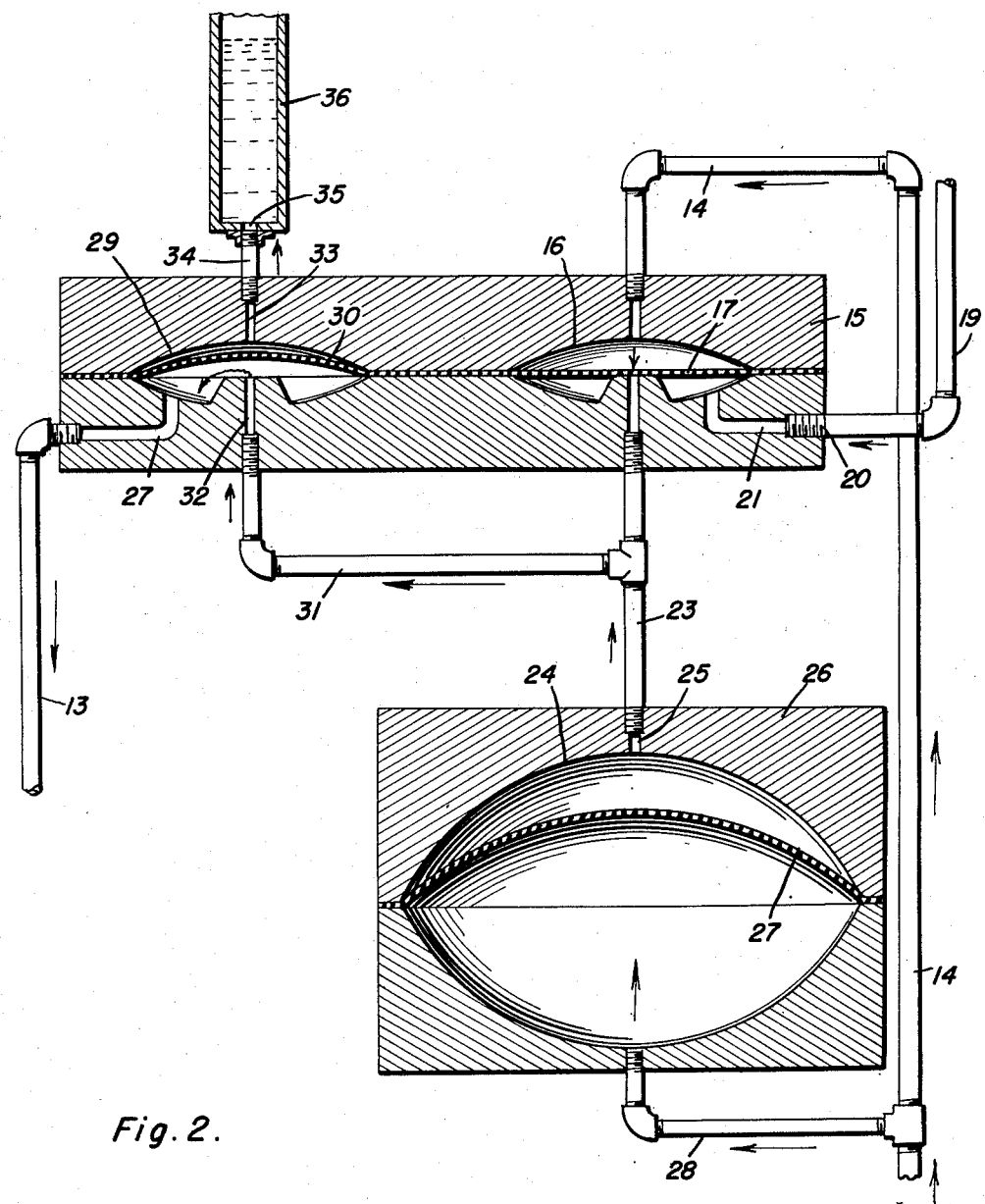
Figure 2 is a view similar to Figure 1 with the parts open for supplying the chemical to the water.
Figure 3:
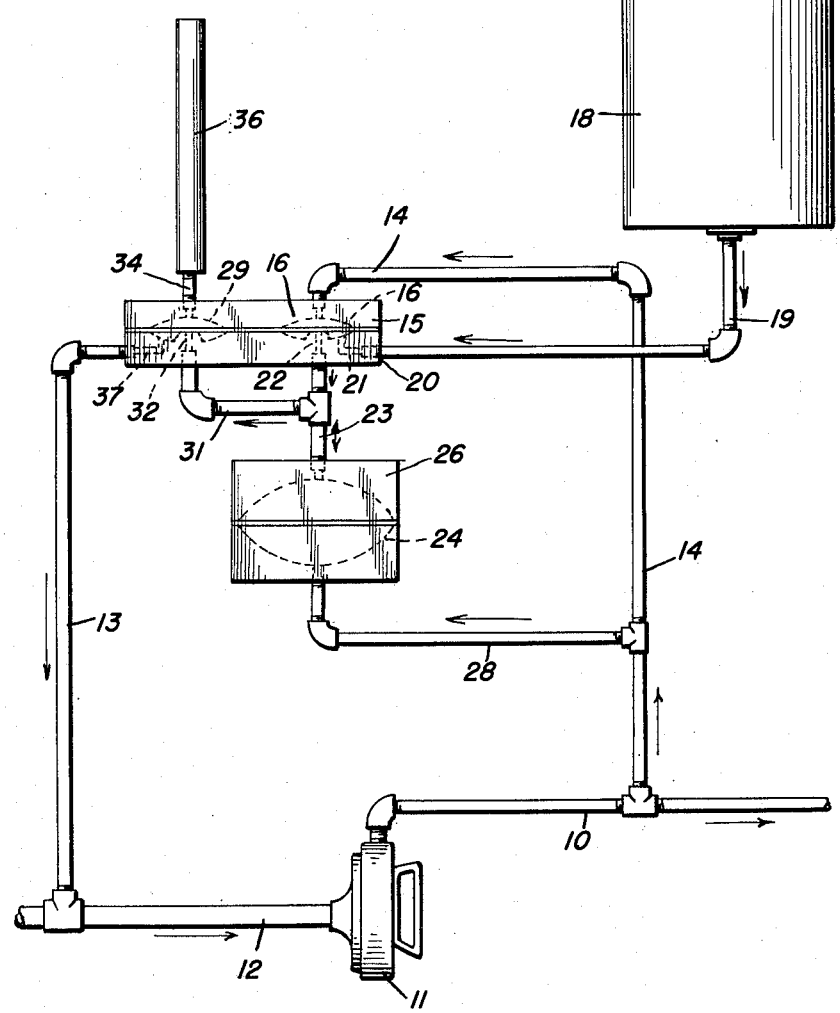
Figure 3 is an elevation of the feeder in its entirety.

This chemical feeder is connected to a chemical supply tank, a water line under pressure and lines carrying the liquid chemical to be used in the treatment. The liquid chemical is put into the flow lines of the body to be treated in a controlled manner by the pressure exerted by a water supply and by gravity. The control is by water pressure, which water pressure is controlled by the starting and stopping of an automatically controlled pump or by the opening and closing of automatically controlled valves of a water line under pressure. The feeder is shown, as connected with a pump, the cycle of start and stop operation of the feeder being controlled by the stop and start of the pump. However, it is to be understood that the feeder is not limited to use with a pump, but may be used in conjunction with solenoid valves, water operated valves, or other means of control equipment.

Referring to the drawings in detail, in which like reference characters designate corresponding parts throughout the several views, 10 designates a water pump discharge line for water under pressure connected to a pump 11, which creates pressure in the pipe 10 and suction in the pipe 12 through which a connection is made to the water supply pipe 12 by a pipe line 13. A connection 14 from the pipe 10 leads to the top of a diaphragm block or chamber 15, preferably constructed in two sections as shown, which is resistant to chlorine or other chemical with which the water is treated, preferably in liquid form. The pipe 14 leads to a circular primary chamber 16 of lenticular cross section, in which a flexible diaphragm 17 is mounted and of chlorine or other chemical liquid resistant material so as to divide the chamber 16 into two compartments with water at the top and the chemical at the bottom for treatment of the water, and so that the liquid chemical and water cannot mix. The chemical supply tank is indicated at 18 and has a discharge pipe 19 which leads into the bottom of the chamber 16 below the diaphragm 17, preferably through one end of the block or chamber 15 as indicated at 20 and has connection with an angular passage 21 extending from the end of the block 15 and the lower section thereof longitudinally and then vertically into the lower portion of the chamber 16.

A discharge passage 22 leads from the bottom of the chamber 16 below the diaphragm 17 and has a pipe 23 connected to the block 15 at the passage 22, and leads into a larger liquid chemical transfer chamber 24 centrally at a passage 25 in the top thereof within a sectional block 26 similar to the block 15 but considerably larger in size. A diaphragm 27 of flexible chemical resistant material is held between the sections of the block 26, and the pipe 23 and passage 25 extend into the upper chamber thereof above the diaphragm, while a pipe 28 extends from the lower chamber beneath the diaphragm and connects with the water supply pipe 14.

A secondary chamber 29 is provided in the block 15 or a separate block provided for this purpose and supported at a suitable elevation, in which a diaphragm 30 of flexible chemical resistant material is also mounted corresponding to the flexible diaphragm 27. These diaphragms form valves and a connection 31 made from the pipe 23 to a passage 32 communicates with the bottom of the chamber 29 below the diaphragm 30. A passage 33 is provided centrally in the chamber 29 above the diaphragm 30 and is connected as indicated by the pipe 34 with the bottom outlet 35 of a tube or column 36 containing a column of liquid which is not sufficient to keep the outlet passage 32 closed when the water pressure is on the line 14. However, when the water pressure is on the line, the liquid in the tube or column 36 exerts a pressure but insufficient to close the outlet 32. Normally, however, the liquid in the tube or column 36 is sufficient to close the outlet passage 32 by means of the diaphragm 30 to the outlet 32 from the lower part of the chamber 29 against the gravity pressure exerted in the lines 31 and 32 from the liquid and the chemical tank supply 18 through the line 19. A discharge passage 37 of right angular formation corresponding to the passage 21 leads from the chamber 29 below the diaphragm 30 near one edge thereof, and communicates with the discharge pipe 13 leading to the supply pipe or water line 12 to the pump 11 connected with a suitable source of supply of water.

Thus, in the operation of the chemical feeder, when the pump is closed down or the pressure shut off on the line 14 as well as the line 10, in any suitable way, as by solenoid or any type valve, there is no pressure in the lines 10 and 14, that is, sufficient pressure to convey the water such as when the line is open by the opening of a faucet or valve to supply a tank or otherwise, thus reducing the pressure in the lines 14 and 28 to the chamber 24 below the diaphragm 27 therein and also to the chamber 16 above the diaphragm 17. The chamber 16 forms a valve chamber and the lack of pressure on top of the diaphragm 17 in the chamber 16 of the control block 15 is not sufficient to seat the diaphragm 16 against the valve seat formed at the communicating end of the passage 22. Thus, the chemical supply from the tank 18 can pass through the pipe 19 into the lower part of the chamber 16 below the diaphragm 17 and escape through the passage 22 and pipe 23 to the top of the chamber 24 above the diaphragm 27 and also through the pipe 31 to the bottom of the chamber 29 below the diaphragm 30 therein. However, the column of water in the tube 36 is sufficient to seat the diaphragm 30 as a valve against the passage 32 where it communicates with the chamber 29 to cut off the lower portion of the chamber 29 from the inlet of the chemical thereto. In this manner, the chemical liquid in the supply tank runs by gravity through the pipe 19 and into the chamber 16 below the diaphragm 17 to unseat the latter by raising the diaphragm owing to its flexible character, the outlet 22 and allows the chemical from the supply tank to flow through the line 22 into the chemical chamber 24. As there is no water pressure in the pipe line 14, there is consequently no pressure in the pipe 28 or the bottom of the chamber 24 below the diaphragm 27 until the diaphragm 27 is forced against the bottom of the chamber 24 to allow the chamber 24 to completely fill with the liquid chemical. When the chamber 24 is completely filled, the liquid chemical flows into the line 23 and the line 31 to the bottom of the valve chamber 29 beneath the diaphragm 30. Owing to the weight and pressure exerted on the top of the diaphragm 30 in the chamber 29 by the weight of a variable height of liquid connected to the top side of the chamber 29 in the tube 36 at 34, which force is greater than the force exerted by the pressure on the bottom of the diaphragm 30 by the pressure from the line 31, the diaphragm closes over the outlet 32 and the line 31 and stops the flow of liquid from the supply tank. The chamber 24 being now fully charged with the liquid chemical to be used in treating the body of water or other body to be treated, the whole system remains in this condition until pressure is applied in the water line at the pipe 10 and through the line 14 to the bottom of the chamber 24 and the top of the chamber 16. When the water pressure is put into the lines 10 and 14, by starting the pump or by opening of the automatic or other valve on the pressure lines 10 and 14, this pressure flows through the line 28 to the bottom of the chamber 24 and exerts pressure on the bottom of the diaphragm 27 in the chemical chamber 24 to force the flexible diaphragm 27 upwardly to the top side of the chamber and forces the liquid chemical from the chamber into the lines 23 and 31 to the outlet 32 and into the chamber 29. The liquid chemical from the tank 18 which has been supplied to the chemical chamber 24, is therefore forced out of the latter chamber into the chamber 29 below the diaphragm 30 against the column of liquid in the tube 36 by raising the diaphragm 30 against the pressure head exerted by said liquid column on the top side of the diaphragm 30 thereby pushing the diaphragm upward of the outlet 32 and allowing the liquid chemical to enter through the chamber 29 to the outlet 37 and pipe 13 which flows into the line 12 and through the pump 11 into the line 10 into the body to be treated. When all chemical is removed from the chamber 24, it remains in this way until the pressure is removed from the line 14 at the line 10, when the chamber 24 again fills with the chemical from the supply tank 18 as heretofore described, so as to repeat the operation in the same manner as set forth.

Thus, it will be seen that the operation of the chemical feeder of the present invention is entirely automatic, with but a simple structure free of moving parts and valves, except for the diaphragms forming the valves in the various chambers into which the water under pressure and the chemical is supplied, so as to be filled therewith and expelled therefrom for intermittent automatic supply to the water or the body to be treated in the pipe lines, in the manner described. The valve box 15 and 26 being constructed of material resistant to the chemical, as well as the flexible diaphragms, the device will operate indefinitely to automatically supply a given, desired or proper quantity of chemical liquid to the water or body to be treated, and therefore may be economically produced and operated at a minimum of expense.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same Having described the invention, what is claimed as new is:

1. In combination with a water supply conduit, a chemical feeder comprising a primary valve chamber having a transverse diaphragm valve therein, a secondary valve chamber having a transverse diaphragm valve therein, a chemical transfer chamber and a transverse diaphragm therein, a liquid chemical supply tank connected to the bottom of the primary valve chamber, a connection between the top of said transfer chamber and said primary and secondary chambers below the respective diaphragm valves thereof, an intermittently actuated pump in said water supply conduit, said conduit at the outlet side of said pump being connected to the bottom of said transfer chamber and to the top of the primary chamber whereby in the absence of water pressure in said conduit chemical may flow through the valve of the primary chamber into the top of the transfer chamber, pressure responsive means for closing the valve of the secondary chamber in the absence of water pressure to prevent chemical passing through the valve of the primary chamber from entering the secondary chamber, and a connection between the secondary chamber and said conduit at the inlet side of said pump, whereby water pressure in the conduit may close the valve in the primary chamber and discharge chemical from the transfer chamber through the valve of the secondary chamber and through the last mentioned connection into said conduit.

2. The device as defined in claim 1 wherein said pressure responsive means comprise a column of liquid connected to the top of the secondary valve chamber and exerting on the valve therein a pressure lesser than the water pressure in said conduit at the outlet side of said pump.

EVERETT W. LANDON.

REFERENCES CITED

The following references are of record in the file of this patent:

UNITED STATES PATENTS

| Number | Name | Date |
|---|---|---|
| 417,034 | Hyatt | Dec. 10, 1889 |
| 417,046 | Kendrick | Dec. 10, 1889 |
| 434,392 | Hyatt | Aug. 12, 1890 |
| 549,479 | Hall | Nov. 5, 1895 |
| 637,250 | Hall | Nov. 21, 1899 |
| 1,412,473 | Lame | Apr. 11, 1922 |
| 2,238,747 | Ornstein | Apr. 15, 1941 |
| 2,417,372 | Morris | Mar. 11, 1947 |